United States Patent

[11] 3,597,662

| | | |
|---|---|---|
| [72] | Inventor | Wardell Gary<br>Beaver, Pa. |
| [21] | Appl. No. | 732,720 |
| [22] | Filed | May 28, 1968 |
| [45] | Patented | Aug. 3, 1971 |
| [73] | Assignee | Westinghouse Electric Corporation<br>Pittsburgh, Pa. |

[54] OFF DELAY SOLID-STATE TIME DELAY APPARATUS
11 Claims, 2 Drawing Figs.

[52] U.S. Cl. .................................... 317/141 S,
  317/148.5 B, 307/252, 307/293
[51] Int. Cl. .................................... H01h 47/32
[50] Field of Search .......................... 317/148.5,
  142, 148.5 B, 141 S; 307/301, 252, 293

[56] References Cited
UNITED STATES PATENTS

| 3,320,493 | 5/1967 | Culbertson | 317/148.5 |
|---|---|---|---|
| 3,210,605 | 10/1965 | Jones | 317/33 |
| 3,478,250 | 11/1969 | Zocholl et al. | 317/33 |
| 3,355,632 | 11/1967 | Wallentowitz | 317/142 |
| 3,131,318 | 4/1964 | Snyder et al. | 307/252 |

Primary Examiner—L. T. Hix
Assistant Examiner—C. L. Yates
Attorneys—A. T. Stratton, Clement L. McHale and M. I. Hull ABSTRACT: An off delay circuit utilizes an output controlled rectifier together with diodes and transistors and an RC network to provide time delay. The controlled rectifier is maintained in conduction by a controllable half cycle trigger current and a half cycle phase shifted load current.

PATENTED AUG 3 1971

3,597,662

WITNESSES:
Bernard R. Gieguay
James T. Young

INVENTOR
Wardell Gary

BY Maury L. Hult
ATTORNEY 3,597,662

1

OFF DELAY SOLID-STATE TIME DELAY APPARATUS

CROSS-REFERENCES TO RELATED APPLICATIONS

This application is related to the copending application of G. Watson for "Internally Generated Auxiliary Direct Current Voltage Source for A Controlled Rectifier Alternating Current Switch," Ser. No. 735,226, filed June 7, 1968; Gary, "Solid-State On Delay Time Delay Apparatus," Ser. No. 732,631, filed May 28, 1968; Thompson et al., "Small Transformerless Solid-State On Delay Timer," Ser. No. 732,721, filed May 28, 1968; Watson, "Off Delay Apparatus," Ser. No. 625,762, filed Mar. 24, 1967; and Thompson, "Semiconductor Time Delay Circuits," Ser. No. 571,613, filed Aug. 10, 1966, all of the foregoing copending applications being assigned to the assignee of the instant invention.

BACKGROUND OF THE INVENTION

1. Field of the Invention

The invention relates to off delay timers suitable for use as a time delayed interlock.

2. Description of the Prior Art

Prior art off delay circuits employing as an output device a controlled rectifier, generally speaking, have required a direct current supply for maintaining the controlled rectifier in conduction and may have required retriggering the controlled rectifier each half cycle.

Some prior art devices use electrolytic capacitors for the timing capacitor, but this is undesirable because of My leakage currents, and capacitance change with aging makes the timing interval unreliable and unstable with temperature variations. Where the timing range is increased, size and cost problems become more difficult. Due to the inherent limited gain of a transistor amplifier, the timing range has had to be increased by using a larger timing capacitor or by adding another capacitor in parallel with the timing capacitor. In either case size and cost are increased. Where a controlled rectifier has been maintained "closed" by retriggering the controlled rectifier each half cycle when the current through the relay coil goes to zero and the controlled rectifier turns off, since the relay coil is highly inductive, the voltage goes to zero when the line voltage is approximately at peak voltage. Accordingly, the controlled rectifier can experience high power dissipation during the turn on intervals of each half cycle triggering. Controlled rectifier power dissipation becomes extremely important due to the small physical size requirements.

My invention overcomes the difficulties, disadvantages and limitations of the aforedescribed prior art structure.

The prior art is exemplified by the following U.S. Pats. Nos.: 3,045,150; 3,365,586; 3,197,656; 3,047,745; 3,162,772; 3,158,757; 3,267,289; 2,845,548; 3,132,261; 3,099,758; 3,202,884.

SUMMARY OF THE INVENTION

In my invention, the output controlled rectifier is maintained in conduction by controllable half cycle trigger current and the half cycle phase shifted load current. No direct current supply is required for maintaining the controlled rectifier in conduction. A novel trigger circuit including novel reset circuit means is provided.

DESCRIPTION OF THE PREFERRED EMBODIMENT

Figure 1:
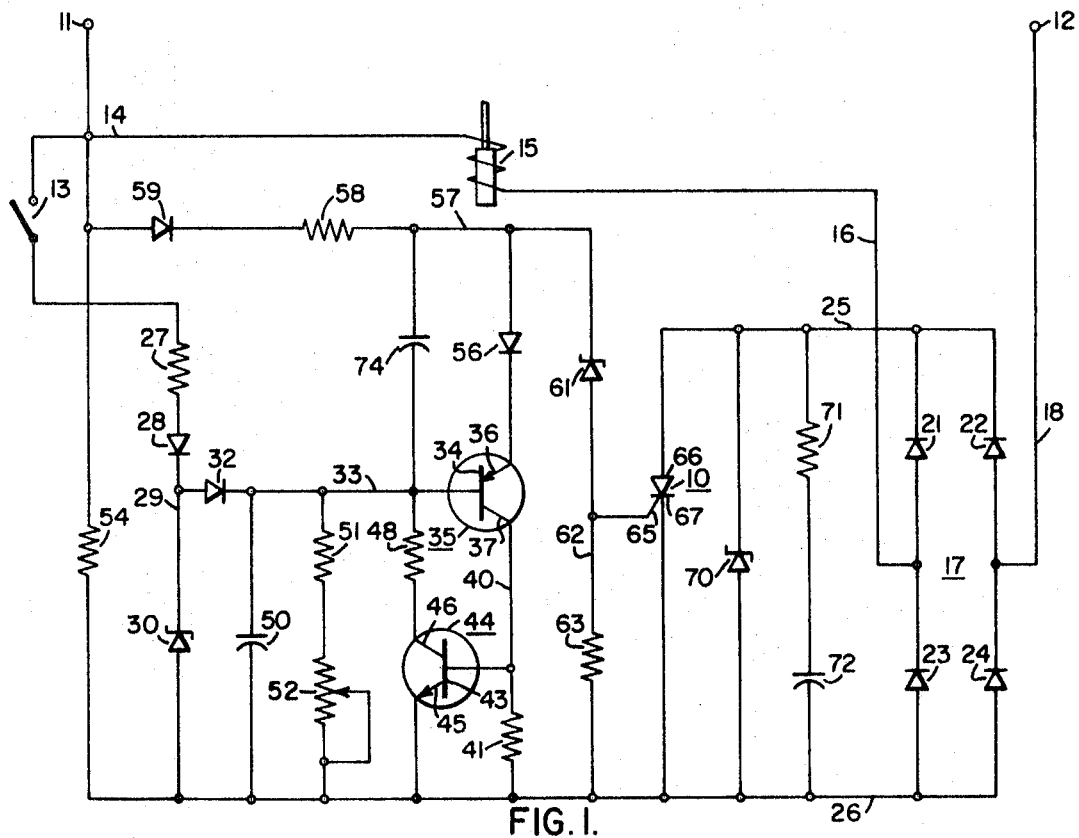
FIG. 1 is a schematic electrical circuit diagram according to the preferred embodiment of my invention.

In the circuit of FIG. 1, terminals 11 and 12 have a continuous alternating current voltage applied thereacross at all times and the controlled rectifier generally designated 10 is normally "open" and coil 15 normally has no current therethrough. An initiating switch 13 is provided which is closed causing the controlled rectifier to conduct and the relay coil 15 to be energized; thereafter the initiating switch is left closed for a predetermined time to allow the capacitor of an R-C timing circuit to become fully charged whereafter initiating switch 13 is reopened. This reopening of the switch 13 starts the aforementioned time delay. After the time delay interval, the controlled rectifier ceases to be conductive and current ceases to flow through the relay coil 15.

Terminal 11 is connected by way of lead 14, contactor or relay coil 15, lead 16, and full wave rectifier generally designated 17 to lead 18 and thence to terminal 12. The full wave rectifier includes diodes 21 to 24 inclusive so arranged as to supply on output leads 25 and 26 a full wave rectified pulsating direct current voltage, lead 25 being positive with respect to lead 26. One terminal of the aforementioned initiating switch is connected to lead 14 and terminal 11 whereas the other terminal of the initiating switch is connected by way of resistor 27, diode 28, lead 29 and Zener diode 30 to the aforementioned lead 26. Resistor 27 may have a value of 22 kilohms, diode 28 may be of a type known in the trade as 1N4822, and Zener diode 30 may be of a type known in the trace as 1N965B. Diode 32 and lead 33 connect lead 29 to the base 34 of a PNP transistor generally designated 35 having an emitter 36 and a collector 37. Diode 32 may be of a type known in the trade as 1N457. Transistor 35 may be of a type known in the trade as 2N3638.

The aforementioned collector 37 is connected by way of lead 40 and resistor 41 to the aforementioned lead 26. Resistor 41 may have a value of 120 kilohms. Lead 40 is connected to the base 43 of an additional transistor of the NPN type generally designated 44 having an emitter 45 and collector 46. Transistor 44 may be of a type known in the trade as a 2N1711. The collector 46 is connected by way of resistor 48 to lead 33 and base 34 of transistor 35. Resistor 48 may have a value of 4.7 K ohms. Emitter 45 of transistor 44 is directly connected to lead 26.

The aforementioned RC timing circuit includes capacitor 50, resistor 41 and adjustable resistor 52. Capacitor 50 is connected between leads 33 and 26, and series connected resistors 51 and 52 are connected in shunt with the capacitor. Capacitor 50 may have a value of 5.0 microfarads, resistor 51 may have a value of 18 K ohms and the potentiometer 52 may have a total resistance of 5.0 megohms.

The aforementioned lead 14 is connected by way of resistor 54 which may have a value of 22 K ohms to the aforementioned lead 26.

The aforementioned emitter 36 of transistor 35 is connected by way of diode 56, lead 57, resistor 58 and diode 59 to aforementioned lead 14 and terminal 11. Diode 59 may be a type known in the trade as 1N4822, resistor 58 may have a value of 22 K, ohms and diode 56 may by a type known in the trade as 1N457.

The aforementioned lead 47 is further connected by way of Zener diode 61, lead 62 and resistor 63 to lead 26. Zener diode 61 may be of a type known in the trade as 1N957B. Resistor 63 may have a value of 390 ohms. Lead 62 and the junction between the latter named Zener diode 61 and resistor 63 is connected to the control element 65 of the controlled rectifier generally designated 10 having an anode 66 and cathode 67. Anode 66 is connected to the aforementioned lead 25 whereas cathode 67 is connected to the aforementioned lead 26. Connected in parallel with the controlled rectifier is an additional Zener diode 70 which may be a 1N3051B. Connected in shunt with the Zener diode 70 are series-connected resistor 71 and capacitor 72. Resistor 71 may have a value of 33 ohms and capacitor 72 may have a value of 0.005 microfarads.

Completing the circuit is a capacitor 74 connected between the base 34 of transistor 35 and the aforementioned lead 57. Capacitor 74 may have a value of 0.01 microfarads.

The circuit of FIG. 1 may be thought as of employing a complementary pair of transistors 35 and 44 as an amplifier to control the gate trigger current to the controlled rectifier 10. The inherent high gain of the complementary pair of transistors makes it possible for the R-C timing circuit including capacitor 50, and resistors 51 and 52 to control the trigger circuit with a relatively low voltage. The maximum voltage the timing capacitor 50 ever attains is 15 v. It will be understood that the component values given heretofore are suitable but are not exclusive and that the circuit of FIG. 1 may be modified to permit a lower voltage on the timing capacitor and hence a physically smaller capacitor where other considerations make this desirable. Also, the high gain of the complementary pair of transistors 35 and 44 allows the timing range to be changed by increasing the resistance of the timing potentiometer or by increasing the resistance value of the fixed timing resistor 51. In either case the timing range is increased without an increase in cost or size of the timing circuit. As previously stated, the circuit also eliminates the necessity for triggering the controlled rectifier each half cycle thereby eliminating unnecessary high-power dissipation which would occur where the controlled rectifier turned on each half cycle.

In understanding the operation of the circuit of FIG. 1, with 120 v. alternating current applied to the input terminals 11 and 12, half cycle current is conducted through diode 59 and resistor 58. As long as the initiating switch is closed, the circuit for supplying a gating signal to the controlled rectifier is completed through Zener diode 61 and resistor 63 thereby gating on the controlled rectifier 10. When the initiating switch is thereafter reopened, current still follows this path until the circuit is timed out and then the current takes a path through the transistors as will be seen more fully hereinafter. If the initiating contact is opened, the timing capacitor 50 is uncharged. As positive voltage appears on the anode of diode 56, transistor 35 becomes forward biased and the complementary pair of transistors 35 and 44 turn on. The voltage on Zener diode 61 is held below the Zener voltage of Zener diode 61 by the low voltage drops of the forward biased diode 56 and the saturated transistors of the complementary pair 35 and 44. Zener diode 61 cannot conduct trigger current into the gate of the controlled rectifier. The controlled rectifier does not conduct and the circuit therethrough remains "open".

As previously stated, the circuit is set for a timing operation by closing the initiating switch 13. When the initiating switch or contacts is closed, half wave current is conducted through resistor 27, diode 28 and diode 32 and charges capacitor 50 to 15 v. minus the diode drop across diode 32. The charging voltage is clamped at 15 v. by Zener diode 30. This charging voltage is maintained on capacitor 50 and the base 34 of transistor 35 as long as the initiating contact or switch 13 remains closed. The emitter 36 of transistor 35 is held at a lower voltage by the Zener diode 61 which has a Zener voltage of 6.8 v. Transistor 35 becomes reverse biased when the base voltage becomes 6.8 v. minus the forward drop through diode 56 and the drop through the emitter-base junction of transistor 35. Thereafter the complementary pair of transistors cannot conduct and the current through diode 59 and resistor 58 is conducted through Zener diode 61 and into the gate of the controlled rectifier 10. The controlled rectifier turns on and the output contact or circuit "closes"; full current flows through relay coil 15.

Figure 2:
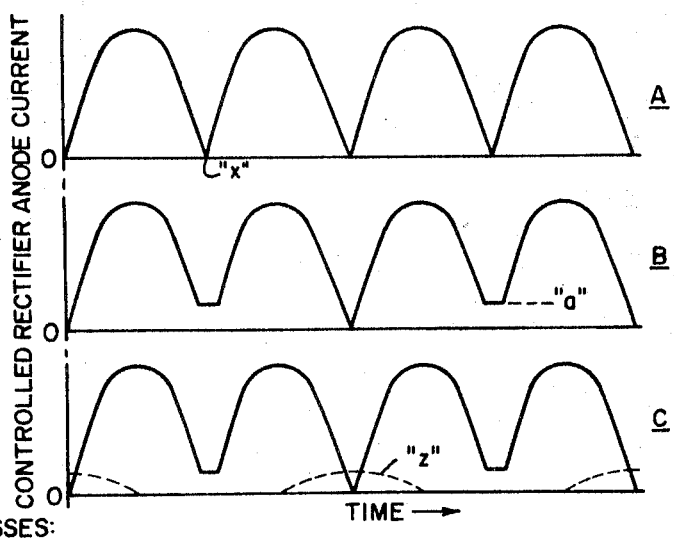
FIG. 2 is a series of graphs illustrating the operation of the apparatus of FIG. 1.

Further elaborating upon the circuit operation while the controlled rectifier is "closed", since the trigger current through diode 59 and resistor 38 is half cycle current and the current through the contactor coil is alternating current, circuit means for maintaining the controlled rectifier in conduction and yet permitting it to be turned off by removing the trigger current is provided. The current through the contactor or relay coil is conducted through the controlled rectifier as pulsating direct current, as shown in curve A of FIG. 2. The controlled rectifier would turn off at the point designated $x$ unless trigger current is applied. With resistor 54 connected as shown, one-half cycle of the current through resistor 54 flows through the controlled rectifier. This resistive load current is approximately 90 electrical degrees out of phase with the current through the contactor coil (which also flows through the controlled rectifier). The resultant load current applied through resistor 54 and the contact coil is shown in curve B of FIG. 2. The load current is held to the level designated $a$ by current through resistor 54. It is seen that the half wave trigger current through diode 49 and resistor 58 is conducted during the opposite half cycle that the load current is supplied through resistor 54, as shown by the dashed line "Z" in curve C of FIG. 2. The controlled rectifier will not revert to its blocking state until the half cycle trigger current is removed.

As previously stated, the timing period begins when the initiating switch 13 is reopened. When the initiating contact is reopened the voltage on the base of transistor 35 starts to decrease as the timing capacitor discharges through the timing resistors 51 and 52; the value of resistance determines the time delay. When the voltage on timing capacitor 50 decreases to the threshold voltage of the complementary pair of transistors, as determined by the Zener voltage of Zener diode 61 and the forward voltage drops of diode 56 and the emitter-base junction of transistor 35, transistor 35 can become forward biased. The complementary pair switches on when current is conducted through diode 59 and resistor 58. The voltage on Zener diode 61 does not reach the Zener voltage. Trigger current is no longer supplied to the controlled rectifier; the controlled rectifier turns off when its anode current goes to zero. The output circuit or "contact" opens and the timing cycle is completed.

The aforementioned diode 32 isolates the timing circuit from the Zener diode regulator 30 when the timing period starts. Diode 70 protects the controlled rectifier from transient overvoltage spikes. Resistor 71 and capacitor 73 comprise a $dv/dt$ slowdown circuit to prevent premature firing of the controlled rectifier with a fast rising anode voltage. Capacitor 74 reduces the high frequency noise voltage sensitivity of the complementary pair of transistors 35 and 44.

The foregoing written description and the drawings are illustrative and exemplary only and are not to be interpreted in a limiting sense.

I claim:

1. Off delay time delay apparatus comprising, in combination, first and second terminals adapted to be connected to a single-phase alternating current line, first and second lead means connected to the first and second terminals respectively, a full wave rectifier having one input directly connected to the second lead means and having the other input thereof adapted to be connected by way of a relay coil to the first lead means, a controlled rectifier having a control element and having the anode-cathode path thereof connected across the output of the full wave rectifier, circuit means connecting the controlled rectifier anode to the positive output lead of the full wave rectifier and connecting the controlled rectifier cathode to the negative output lead of the controlled rectifier, the controlled rectifier while gated on forming a closed alternating current switch and causing full energizing current to flow from the alternating current line through the relay coil, said controlled rectifier being normally in a nonconductive condition, other circuit means including in series a first diode, a first resistor and a first Zener diode connecting the control element of the controlled rectifier to the first lead means, a second resistor connecting the control element of the controlled rectifier to the negative output lead of the full wave rectifier, a pair of complementary NPN and PNP transistors, the emitter of the NPN transistor being connected to the negative terminal of the full wave rectifier, means forming a connection between the collector of the NPN transistor and the base of the PNP transistor, an R-C timing circuit including a timing capacitor and an adjustable timing resistor connected in parallel, one terminal of the parallel timing circuit being connected to the base of the PNP transistor and the other terminal of the parallel R-C timing circuit being connected to said aforementioned negative output lead of the full wave rectifier, a second diode connecting the emitter of the PNP transistor to the junction between the first resistor and the first Zener diode, current flowing through said second diode and through the emitter-base junction of the PNP transistor producing a voltage across the base thereof determined by the voltage drop in the timing resistor, said last-named voltage causing the pair of complementary transistors to conduct whereby the voltage at the junction between the first resistor and the first Zener diode is reduced to a value less than the Zener voltage of said first Zener diode and no gate current is supplied through said first Zener diode to the control element of the controlled rectifier, an initiating switch having one terminal thereof connected to the first lead and to the first terminal, circuit means including in series a third resistor, a third diode and a fourth diode connecting the other terminal of the initiating switch to the timing capacitor, a second Zener diode connected between the junction between the third and fourth diodes and said negative output lead of the full wave rectifier, closing the initiating switch causing the aforementioned timing capacitor to be quickly charged to a voltage which when applied to the base of the PNP transistor renders the pair of complementary transistors nonconductive thereby causing current to cease to flow through the first diode connected between the emitter of the PNP transistor and the junction between the first resistor and the first Zener diode, thereby causing the voltage at said junction to rise to a value which exceeds the Zener voltage of the first Zener diode thereby causing a gating current to pass through the first Zener diode and to be applied to the control element of the controlled rectifier causing said controlled rectifier to be gated on and causing full current to flow through said relay coil, said initiating switch being adapted to be thereafter opened, said timing resistor discharging said timing capacitor within a predetermined time interval after the switch is opened to a voltage at which current begins to flow through the emitter-base junction of the PNP transistor and through the second diode connected to the junction between the first resistor and the first Zener diode thereby causing the voltage at said junction to fall to a value less than the Zener voltage of the first Zener diode thereby causing the controlled rectifier to assume a nonconductive circuit open condition and thereby causing current through the relay coil to fall to zero.

2. Off delay time delay apparatus according to claim 1 in which the pair of complementary transistors are additionally described as providing a high gain thereby permitting the R-C timing circuit to utilize a capacitor charged to a relatively low voltage.

3. Off delay time delay apparatus according to claim 2 in which the high gain of the complementary pair of transistors permits increasing the resistance value of the timing resistor thereby increasing the timing range.

4. Off delay time delay apparatus according to claim 1 in which the gating signal applied to the control element of the controlled rectifier by way of the first diode, first resistor and first Zener diode has a time phase difference from the alternating current in the relay coil thereby assisting in maintaining the controlled rectifier in a conductive condition and thereby reducing the power dissipation in the controlled rectifier.

5. Off delay time delay apparatus according to claim 1 including in addition a further Zener diode connected across the anode-cathode terminals of the controlled rectifier to protect the controlled rectifier from transient peak voltages applied thereacross.

6. Off delay time delay apparatus according to claim 1 in which the relay coil current is conducted through the controlled rectifier as a pulsating direct current, and including in addition resistance means connecting the controlled rectifier to the first terminal whereby the full cycle of the alternating waveform between the first and second terminals flows through the resistance means, said resistance means being operatively connected to the controlled rectifier whereby the half wave current through the resistance means flows through the controlled rectifier, said half wave current through the resistance means being substantially 90 electrical degrees out of phase with the alternating current through the relay coil.

7. Off delay time delay apparatus according to claim 1 in which said fourth diode interposed between the timing capacitor and the voltage regulating second Zener diode isolates the timing capacitor from the last-named Zener diode voltage regulator when the timing period starts thereby insuring that said timing capacitor can discharge only through said timing resistor.

8. Off delay time delay apparatus according to claim 1 including in addition a further resistor and a further capacitor connected in series with each other and in shunt with the anode-cathode path through the controlled rectifier comprising a $dv/dt$ slowdown circuit to thereby prevent premature firing of the controlled rectifier with a fast rising anode voltage.

9. Off delay time delay apparatus according to claim 1 including a further capacitor connected from the base of the PNP transistor to the junction between the first resistor and the first Zener diode, said last-named capacitor providing means for reducing the high frequency noise voltage sensitivity of said complementary pair of transistors.

10. In off delay time delay apparatus of the type having a pair of terminals adapted to be connected to an alternating current line and including a full wave rectifier having one input thereof connected to one of said terminals, the other input of the full wave rectifier being adapted to be connected by a relay coil to the other of said terminals, and a controlled rectifier having the anode-cathode path thereof connected across the output of the full wave rectifier with transistor circuit means including Zener diode means for initiating conduction in the controlled rectifier, the improvement which includes means for maintaining the controlled rectifier in conduction without a direct current supply therefor and without retriggering the controlled rectifier each half cycle, said means including resistor means connected to one of the terminals and to the cathode of the controlled rectifier for obtaining a half wave pulsating direct current substantially 90° different in phase from the pulsating direct current flowing through said controlled rectifier as a result of alternating current flowing through said relay coil, and causing the current through the resistor means to flow through the controlled rectifier.

11. In off delay time delay apparatus of the type having a pair of input terminals adapted to be connected to an alternating current line with a full wave rectifier having one input thereof connected to one of said terminals and having the other input thereof adapted to be connected by way of a relay coil to the other of said terminals, and having a controlled rectifier connected with the anode-cathode path thereof across the output of the full wave rectifier to provide an alternating current switch which while the controlled rectifier is conductive causes full alternating current to flow through the relay coil, the improvement which comprises trigger means including a Zener diode and a resistor in series therewith with the junction between the Zener diode and the resistor connected to the control element of the controlled rectifier, diode means and other resistor means connecting the Zener diode to one of said terminals, normally conductive means connected to the Zener diode for maintaining the voltage drop across the Zener diode at a value less than the Zener voltage thereof whereby no gating current is supplied to the controlled rectifier, and means including an initiating switch and circuit means connected thereto for rendering said normally conductive means nonconductive to thereby cause the voltage across the Zener diode to rise to a value sufficient to cause current to flow therethrough and thereby supply a gate signal to the controlled rectifier.